Sept. 9, 1924.
W. T. RAMSDELL
AUTOMOBILE TOURIST TENT
Filed May 11, 1923      2 Sheets-Sheet 1
1,508,065
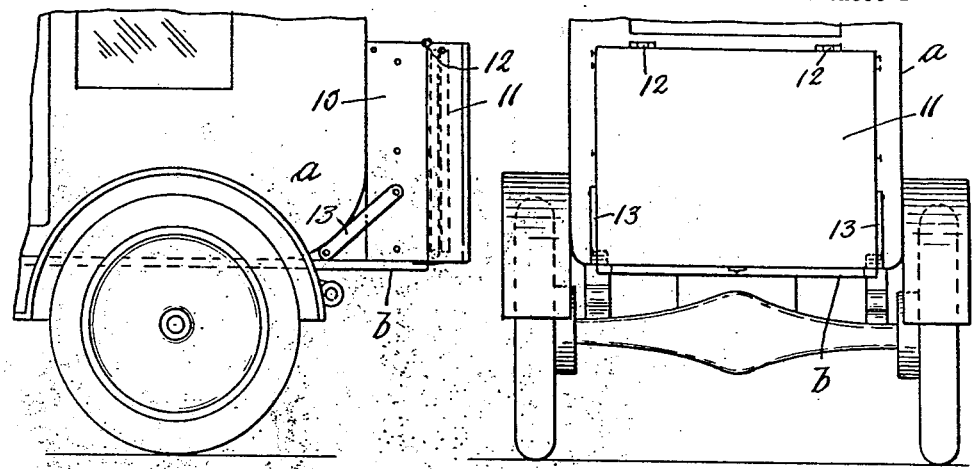
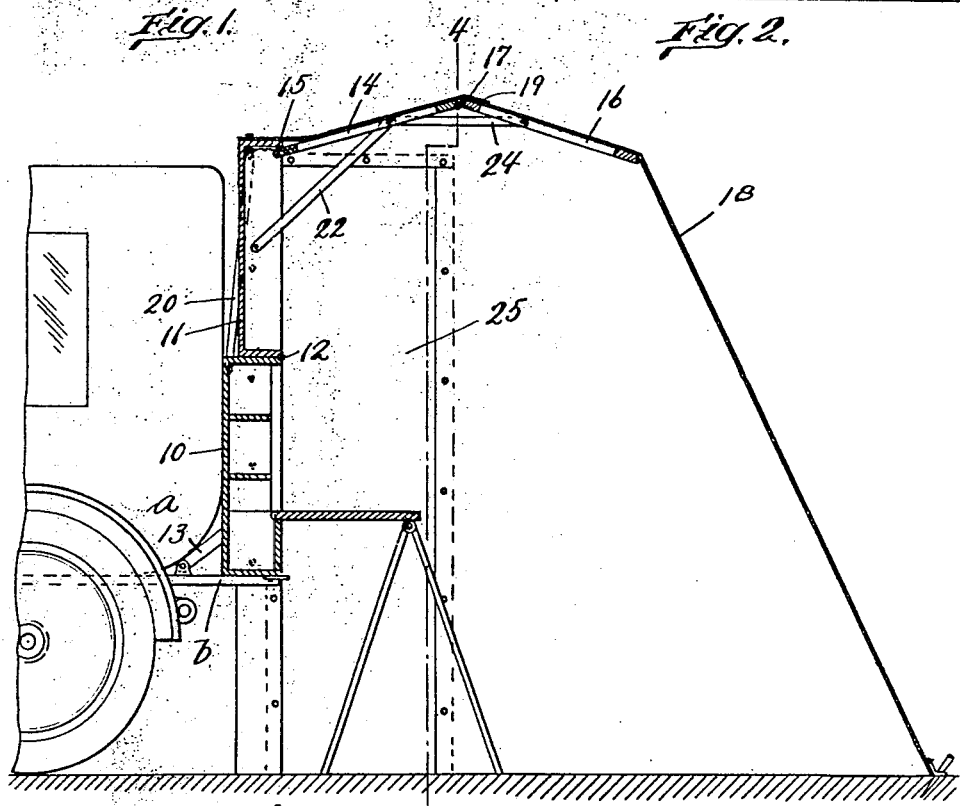

Sept. 9, 1924.  
W. T. RAMSDELL  
AUTOMOBILE TOURIST TENT  
Filed May 11, 1923  
1,508,065  
2 Sheets-Sheet 2
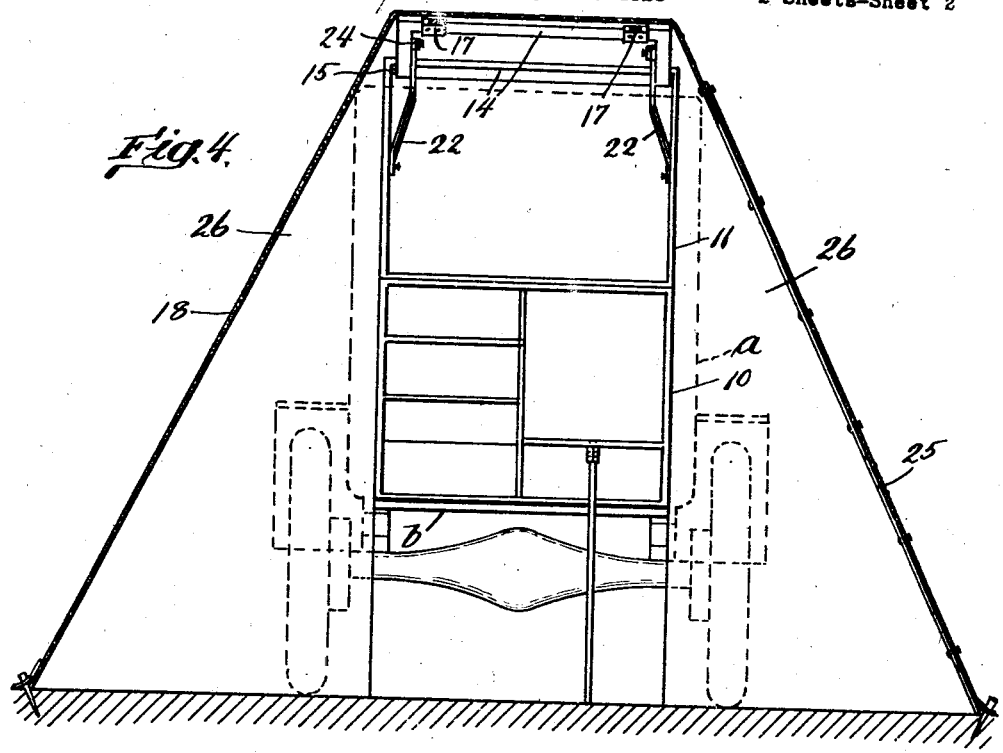
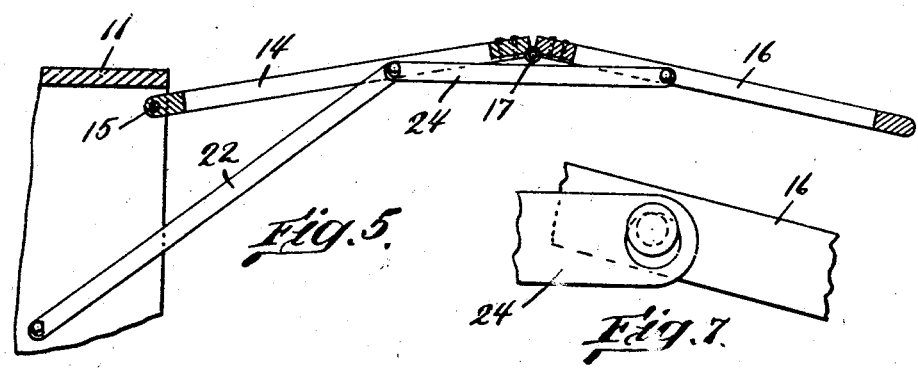
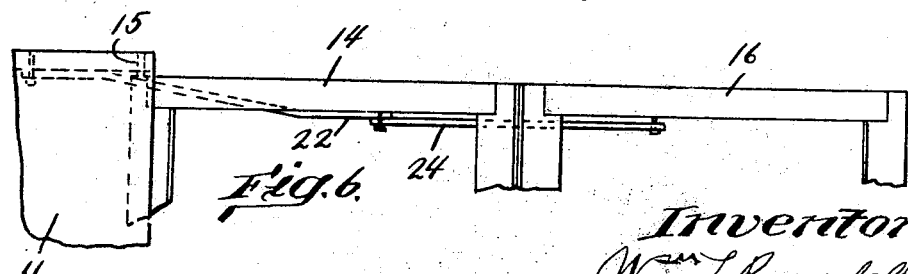
Inventor.  
W<sup>m</sup> T. Ramsdell  
by L. H. Hanmer  
Atty.

Patented Sept. 9, 1924.

1,508,065

UNITED STATES PATENT OFFICE.

WILLIAM T. RAMSDELL, OF HAVERHILL, MASSACHUSETTS.

AUTOMOBILE TOURIST TENT.

Application filed May 11, 1923. Serial No. 638,158.

*To all whom it may concern:*

Be it known that I, WILLIAM T. RAMSDELL, a citizen of the United States, a resident of Haverhill, in the county of Essex and Commonwealth of Massachusetts, have invented an Improvement in Automobile Tourist Tents, of which the following is a specification.

This invention relates to camping outfits which are primarily designed for use in connection with an automobile, and, more particularly, to a combined trunk, tent support and tent, which is adapted to be carried on the rear end of an automobile, so that the outfit may be conveniently employed when touring.

The objects of my invention are to provide a form of trunk which is adapted to be conveniently mounted on the usual baggage carrier, at the rear end of the automobile, or attached thereto in any convenient manner, and which is further provided with a tent supporting means which may be folded into the trunk, and, when unfolded, will act as a spreading and supporting means for the tent and which will permit the tent to be compactly folded with said spreading means, within the trunk, when not in use.

Further objects are to provide a form of trunk so arranged that the tent may be unfolded from the trunk and erected without removing the trunk from the automobile, whereby the trunk may be practically permanently attached thereto, and further, which may be so arranged that the interior of both the trunk and its lid may be conveniently employed to contain various camping utensils, all of which will be conveniently accessable from within the tent when in position for use.

I accomplish these objects in the manner hereinafter described and as illustrated in the accompanying drawings in which:—

Figs. 1 and 2 are side and rear end views of a portion of an automobile body with an embodiment of my invention applied thereto, and showing the same in folded position.

Fig. 3 is a central sectional view thereof showing the same unfolded, or with the tent erected.

Fig. 4 is a section at line 4—4 of Fig. 3.

Figs. 5, 6 and 7 are detail views of the tent supporting means which I employ.

According to my invention, I provide a rectangular shaped box or trunk 10, having a lid 11, of box form, for closing its open side, the length of the trunk being less than the width of the automobile body $a$, or other carrier in connection with which it is used, and the width thereof being less than the distance from the baggage carrier $b$, on the automobile, to the top of its covering.

The trunk 10 is mounted with its front side on the baggage carrier, and with its bottom against the rear end of the automobile body, so that its lid 11, when in closed position, depends from the hinges 12 by which it is connected to the trunk 10. Any suitable means for securely connecting the trunk to the automobile body may be employed, as the metal straps 13. A spreader section, comprising a pair of parallel arms connected by cross bars to form a frame 14, is connected by hinges 15 to the opposite edge of the lid 11 from its hinged edge, and a second spreader section, of similar form, or frame 16 is connected by hinges 17 to the opposite edge of the frame 14 from its hinges 15, the dimensions of said frames being such that the frame 16 may be folded onto the frame 14, and both may be folded into the lid 11, as indicated in dotted lines in Fig. 1.

The tent canvas 18 extends over the frames 14 and 16 and is secured thereto in a manner to permit the frames to be folded together, so that, when the frames are in folded position the canvas may be folded in between them, and the frames, and canvas together may be folded into the lid, and when unfolded, the joint between the frames may be covered by a flap 19. When it is desired to unfold the tent and set it up, the lid 11 is first unlocked and swung upward until its upper, or hinged edge comes to rest on the uppermost side of the trunk. The lid is thus held in a vertical position with its interior opening towards the rear and it is secured in this position in any convenient manner, as by removable straps 20 connecting the lid and trunk. The frames 14 and 16 are then swung outward from the lid and the frame 14 is swung upward, preferably slightly above the horizontal, so that it inclines upward from the lid, and it is supported in this position by braces 22, which are removably connected to the side members thereof and to the ends of the lid. The frame 16 is then swung up nearly to the horizontal, or until it slopes slightly downward from the frame 14 and it is supported in this position by braces 24, which are removably connected to the sides of the frames 14 and 16. The canvas is so formed, and is of such length, that when the frames 14, 16 are supported in the approximately horizontal positions above described and shown in Fig. 3, the canvas may be drawn downward and outward obliquely from the frames at each side edge and at the end edge of frame 16 to the ground.

The canvas is drawn tight and secured to the ground at its edges, so that the tent, as thus constructed, has a slightly pitched roof, formed by the frames 14 and 16, and sloping sides and end. As a matter of convenience, I form a door section 25 in the canvas at each side, each section being connected to the main portion 18 by any convenient form of fastener at the top and at one edge and the opposite edge of each door section is attached to one edge of a triangular shaped end section 26, the opposite edges of said sections 26 being attached by fasteners to the adjacent end of the lid and trunk, so as to close the end portion of the tent, thus erected which is not closed by the trunk and lid.

The interior of the trunk is provided with various shelves and compartments, in which various articles, useful in camping may be placed, including a folding table as indicated, and the interior of the lid may be employed for similar purposes, as the entire space therein is not required for the canvas and frames.

The trunk and lid also provide a convenient form of cupboard while the tent is being occupied.

When made in the proportions indicated, there is sufficient room in the tent to permit two cots, for sleeping purposes, to be set up.

The above described construction enables the tent to be quickly erected, and, as readily, to be taken down and folded, and, as the supporting means for the canvas is rigidly mounted on the automobile, the tent is unlikely to be blown down.

I claim—

1. In combination with a box, a lid therefor pivoted to the upper side thereof and arranged to be supported thereon in upright position, removable connections for retaining the lid in said positions, a tent spreader mounted at one end on said lid, means for holding said spreader in an angular position relative to the lid, and a tent arranged to be supported by said spreader.

2. In combination with a box, a lid therefor pivoted to the upper side thereof and arranged to be supported thereon in upright position, removable connections for retaining the lid in said positions, an arm pivoted at one end to a portion of the lid opposite its connection with the box, means for sustaining said arm in approximately right angular relation to the lid, and a tent arranged to be supported by said arm, and to be folded therewith on the inner side of the lid.

3. In combination with a box, a lid therefor pivoted to the upper side thereof and arranged to be supported thereon in upright position, removable connections for retaining the lid in said positions, a tent spreader pivotolly connected at one end to the opposite portion of the lid from its pivoted edge, removably connected braces for supporting said spreader in approximately right angular relation to the lid and a tent arranged to be supported on the spreader and to be folded therewith onto the inner side of the lid.

4. In combination with a carrier having a support, a trunk secured on said support with its bottom upright and its open side facing from the carrier, a lid for closing said side, pivoted to the upper side of the trunk and adapted to swing from a position in which it is suspended from its pivots, to a position in which it extends upward therefrom, means for temporarily securing the lid in the latter position, a tent spreader pivoted at one end to the lid at opposite points from its pivotal connection with the trunk, means for supporting said spreader in position to extend approximately horizontally from the lid when the latter is in raised position and a tent adapted to be supported by the spreader, when in said position, and to depend therefrom.

5. In combination with a carrier having a support, a trunk secured on said support with its bottom upright and its open side facing from the carrier, a lid for closing said side pivoted to the upper side of the trunk and adapted to swing from a position in which it is suspended from its pivots, to a position in which it extends upward therefrom, means for temporarily securing the lid in the latter position, a two section spreader pivoted to the lid oppositely to its connection with the trunk and arranged to be folded onto the inner side of the lid, means detachably connecting said spreaded and lid to sustain the spreaded in an approximately horizontal position when unfolded, and a tent adapted to be supported by the spreader when in raised position and to depend therefrom.

6. In combination with a carrier having a support, a rectangular shaped box secured on said support with its bottom in upright position next the carrier, a box like lid for said box hinged to the uppermost side thereof, at its front edge, and adapted to be swung upward to an upright position, so that it will be supported in said position on said uppermost side and means for securing the lid in said position, a pair of spreader sections, each corresponding in size to said lid and having a hinged connection with each other, to permit them to be folded together, and one of said sections having a hinged connection with the opposite edge of the lid from its hinges, to permit said sections to be folded into the lid and to be raised to an approximately horizontal position, removably connectable braces for supporting said sections in fixed relation with each other and with the lid, and a tent adapted to be supported on said spreader sections when in said position and to depend therefrom.

7. In combination with a carrier having a rectangular shaped box supported thereon, with its open side facing outward therefrom, and its bottom upright and next its carrier, a lid for closing said open side having a hinged connection with the upper side of the box and adapted to be swung upward to an upright position, means for securing the lid in said upright position, a pair of frames of a size corresponding to said lid, hinged together and to the lid opposite its connection with the box, means for temporarily holding said frames in an approximately horizontal position and in fixed relation with each other and with the lid, and a tent cover secured on said frames and adapted to extend obliquely outward and downward therefrom to the ground at the sides and the end thereof.

8. In combination with a carrier having a rectangular shaped box supported thereon, with its open side facing outward therefrom, and its bottom upright and next its carrier, a lid for closing said open side having a hinged connection with the upper side of the box and adapted to be swung upward to an upright position, means for securing the lid in said upright position, a pair of frames of a size corresponding to said lid, hinged together and to the lid opposite its connection with the box means for temporarily holding said frames in an approximately horizontal position and in fixed relation with each other and with the lid, and a tent cover secured on said frames and adapted to extend obliquely outward and downward therefrom to the ground at the sides and the end thereof, to form sloping side and end portions, and having end sections extending inward from said side portions and detachably connected to the ends of the box and lid.

9. In combination with a carrier having a rectangular shaped box supported thereon, with its open side facing outward therefrom, and its bottom upright and next its carrier, a lid for closing said open side having a hinged connection with the upper side of the box and adapted to be swung upward to an upright position, means for securing the lid in said upright position, a pair of frames of a size corresponding to said lid, hinged together and to the lid opposite its connection with the box, means for temporarily holding said frames in positions in which each frame slopes slightly downward from their point of connection with each other and a tent cover secured on said frames and arranged to slope outward therefrom to the ground at the sides and end thereof.

In testimony whereof, I have signed my name to this specification.

WILLIAM T. RAMSDELL.